ized under 35

(12) United States Patent
Yamada et al.

(10) Patent No.: US 11,552,285 B2
(45) Date of Patent: Jan. 10, 2023

(54) NON-AQUEOUS ELECTROLYTE SECONDARY BATTERY

(71) Applicant: TOYOTA JIDOSHA KABUSHIKI KAISHA, Toyota (JP)

(72) Inventors: Takanobu Yamada, Toyota (JP); Yasushi Tsuchida, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 378 days.

(21) Appl. No.: 16/986,851

(22) Filed: Aug. 6, 2020

(65) Prior Publication Data

US 2021/0066705 A1 Mar. 4, 2021

(30) Foreign Application Priority Data

Sep. 2, 2019 (JP) .............................. JP2019-159810

(51) Int. Cl.
*H01M 4/131* (2010.01)
*H01M 4/62* (2006.01)
(Continued)

(52) U.S. Cl.
CPC ........... *H01M 4/131* (2013.01); *H01M 4/362* (2013.01); *H01M 4/505* (2013.01); *H01M 4/525* (2013.01); *H01M 4/628* (2013.01); *H01M 10/0525* (2013.01); *H01M 10/4235* (2013.01); *H01M 2004/028* (2013.01); *H01M 2010/4292* (2013.01)

(58) Field of Classification Search
None
See application file for complete search history.

(56) References Cited

U.S. PATENT DOCUMENTS

| 2004/0202928 A1 | 10/2004 | Miyamoto et al. | |
|---|---|---|---|
| 2012/0115030 A1* | 5/2012 | Tanaka | H01M 10/4235 428/323 |
| 2015/0147624 A1* | 5/2015 | Yamafuku | H01M 10/0585 29/623.5 |

FOREIGN PATENT DOCUMENTS

| JP | 2004-259625 A | 9/2004 |
|---|---|---|
| JP | 2016-091898 A | 5/2016 |

(Continued)

*Primary Examiner* — Carlos Barcena
(74) *Attorney, Agent, or Firm* — Oliff PLC (57) ABSTRACT

A non-aqueous electrolyte secondary battery including electrode body having structure in which positive electrode and negative electrode are laminated with separator and non-aqueous electrolyte. The positive electrode includes positive electrode current collector, positive electrode active material layer which is disposed on positive electrode current collector and contains first positive electrode active material, and insulating layer which is disposed along one end of positive electrode active material layer in predetermined width direction, and contains inorganic filler and second positive electrode active material. The negative electrode includes negative electrode current collector, and negative electrode active material layer which is disposed on negative electrode current collector and contains negative electrode active material, in which length in width direction is longer than length of positive electrode active material layer in width direction, and negative electrode active material layer faces positive electrode active material layer and at least part of insulating layer.

8 Claims, 3 Drawing Sheets

(51) Int. Cl.
*H01M 4/36* (2006.01)
*H01M 4/505* (2010.01)
*H01M 4/525* (2010.01)
*H01M 4/42* (2006.01)
*H01M 10/0525* (2010.01)
*H01M 10/42* (2006.01)
*H01M 4/02* (2006.01)

(56) References Cited

FOREIGN PATENT DOCUMENTS

JP 2016-225039 A 12/2016
WO WO-2021038860 A1 * 3/2021

* cited by examiner

NON-AQUEOUS ELECTROLYTE SECONDARY BATTERY

CROSS REFERENCE TO RELATED APPLICATION

This application claims the benefit of priority to Japanese Patent Application No. 2019-159810 filed on Sep. 2, 2019. The entire contents of this application are hereby incorporated herein by reference.

BACKGROUND OF THE DISCLOSURE

1. Field

The present invention relates to a non-aqueous electrolyte secondary battery.

2. Background

In recent years, non-aqueous electrolyte secondary batteries such as lithium ion secondary batteries have been suitably used for portable power supplies for computers and mobile terminals and power supplies for driving vehicles such as electric vehicles (EV), plug-in hybrid vehicles (PHV), and hybrid vehicles (HV).

Generally, a non-aqueous electrolyte secondary battery includes an electrode body in which a positive electrode and a negative electrode are insulated by a separator or the like. Here, in order to prevent deposition of charge carriers (lithium ions in a lithium ion secondary battery) in the negative electrode, generally, the positive electrode and the negative electrode are designed so that the size of the negative electrode in the width direction is larger than the size of the positive electrode in the width direction. For example, Japanese Patent Application Publication No. 2004-259625 discloses a positive electrode having an insulating layer along an end of a positive electrode active material layer on the surface of a positive electrode current collector in such a non-aqueous electrolyte secondary battery. Japanese Patent Application Publication No. 2004-259625 describes that this insulating layer can prevent short circuiting between a positive electrode current collector and an edge of a negative electrode active material layer that faces the positive electrode current collector.

SUMMARY

In the above non-aqueous electrolyte secondary battery, a negative electrode active material layer has a part that faces a positive electrode active material layer (facing part) and a part (non-facing part) that does not face the positive electrode active material layer. When a secondary battery is charged, charge carriers (lithium ions, etc.) are released into an electrolytic solution from the positive electrode active material layer. In this case, in a negative electrode, charge carriers in the electrolytic solution enter the negative electrode active material layer and are stored in the negative electrode active material layer. According to studies by the inventors, charge carriers are likely to be stored in the facing part of the negative electrode active material layer at the beginning of charging and also diffuse into the non-facing part as charging proceeds. That is, in the negative electrode active material layer, charge carriers diffuse not only into the part that faces the positive electrode active material layer but also into the part that does not face the positive electrode active material layer.

Therefore, it is thought that, during charging, the amount of charge carriers released is larger at the edge of the positive electrode active material layer in the width direction than at an intermediate part that faces the negative electrode active material layer in the width direction. Therefore, a potential may locally increase at the edge of the positive electrode active material layer. In this manner, when the potential of the edge of the positive electrode active material layer locally significantly increases, there is a risk of a metal such as a transition metal in the positive electrode active material being eluted at the edge. In addition, when the metal is eluted, a film may be formed on the surface of the facing negative electrode. In the negative electrode, the film becomes a resistance, and may cause deposition of a metal derived from charge carriers (for example, deposition of metallic lithium in a lithium ion secondary battery).

The present invention has been made in view of such circumstances, and an object of the present invention is to provide a non-aqueous electrolyte secondary battery in which it is possible to reduce elution of a metal such as a transition metal in a positive electrode active material in a positive electrode active material layer.

The non-aqueous electrolyte secondary battery disclosed here includes an electrode body having a structure in which a positive electrode and a negative electrode are laminated with a separator therebetween and a non-aqueous electrolyte. The positive electrode includes a positive electrode current collector, a positive electrode active material layer which is disposed on the positive electrode current collector and contains a first positive electrode active material, and an insulating layer which is disposed along one end of the positive electrode active material layer in a predetermined width direction, and contains an inorganic filler and a second positive electrode active material. The negative electrode includes a negative electrode current collector, and a negative electrode active material layer which is disposed on the negative electrode current collector and contains a negative electrode active material, in which a length in the width direction is longer than a length of the positive electrode active material layer in the width direction, and the negative electrode active material layer faces the positive electrode active material layer and at least a part of the insulating layer.

In such a configuration, it is possible to reduce elution of a metal such as a transition metal in the positive electrode active material in the positive electrode active material layer.

In a preferable aspect of the non-aqueous electrolyte secondary battery disclosed here, in the electrode body, when a total capacity (mAh) of the first positive electrode active material contained in the positive electrode active material layer is set as C and a total capacity (mAh) of the negative electrode active material contained in the negative electrode active material layer is set as A, a total capacity (mAh) L of the second positive electrode active material contained in the insulating layer is defined as an amount at which $(1-C/A) \times n$ (where, $n \geq 0.60$) is satisfied.

In such a configuration, it is possible to further reduce elution of a metal such as a transition metal in the positive electrode active material in the positive electrode active material layer.

In a preferable aspect of the non-aqueous electrolyte secondary battery disclosed here, the total capacity (mAh) L of the second positive electrode active material is defined as an amount at which $(1-C/A) \times n$ (where, $n \geq 0.65$) is satisfied.

In such a configuration, it is possible to reduce elution of a metal such as a transition metal. In addition, it is possible to reduce deposition of a metal derived from charge carriers such as lithium on the surface of the negative electrode active material layer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, embodiments of the present invention will be described. Here, components other than those particularly mentioned in this specification that are necessary for implementation of the present invention (for example, general configurations and production processes of a non-aqueous electrolyte secondary battery that do not characterize the present invention) can be recognized by those skilled in the art as design matters based on the related art in the field. The present invention can be implemented based on content disclosed in this specification and common technical knowledge in the field.

Here, "secondary battery" in this specification generally refers to a power storage device that can be repeatedly charged and discharged, and is a term including a so-called storage battery and a storage element such as an electric double layer capacitor. In addition, "lithium ion secondary battery" in this specification refers to a secondary battery which uses lithium ions as charge carriers and realizes charging and discharging according to movement of charges involved in lithium ions between positive and negative electrodes. Hereinafter, although the technology disclosed here will be described in detail using a flat rectangular lithium ion secondary battery as an example, the technology disclosed here is not intended to be limited to those described in these embodiments.

Figure 1:
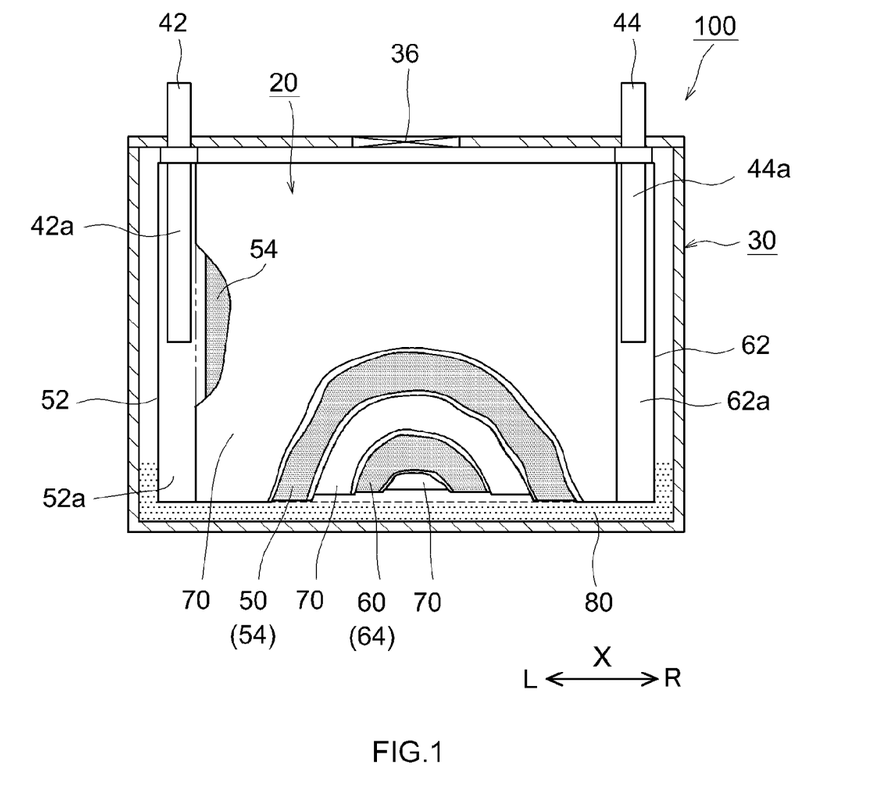
FIG. 1 is a cross-sectional view schematically showing an internal structure of a lithium ion secondary battery according to one embodiment.

FIG. 1 is a cross-sectional view schematically showing an internal structure of a lithium ion secondary battery 100 according to one embodiment. Members and parts having the same functions are denoted by the same reference numerals in the following drawings, and redundant descriptions thereof will be omitted or simplified. In addition, the symbols X and Y in the drawings represent a width direction and a longitudinal direction. The symbols X and Y are orthogonal to each other in a plan view.

The lithium ion secondary battery 100 shown in FIG. 1 is a sealed battery that is constructed when a flat wound electrode body 20 and a non-aqueous electrolyte 80 are housed in a flat rectangular battery case (that is, an outer container) 30. In the battery case 30, a positive electrode terminal 42 and a negative electrode terminal 44 for external connection, and a thin safety valve 36 that is set, when an internal pressure of the battery case 30 increases to a predetermined level or more, to release the internal pressure, are provided. In addition, an inlet (not shown) into which the non-aqueous electrolyte 80 is injected is provided in the battery case 30. The positive electrode terminal 42 is electrically connected to a positive electrode current collecting plate 42a. The negative electrode terminal 44 is electrically connected to a negative electrode current collecting plate 44a. Regarding the material of the battery case 30, for example, a lightweight metal material having favorable thermal conductivity such as aluminum is used.

Figure 2:
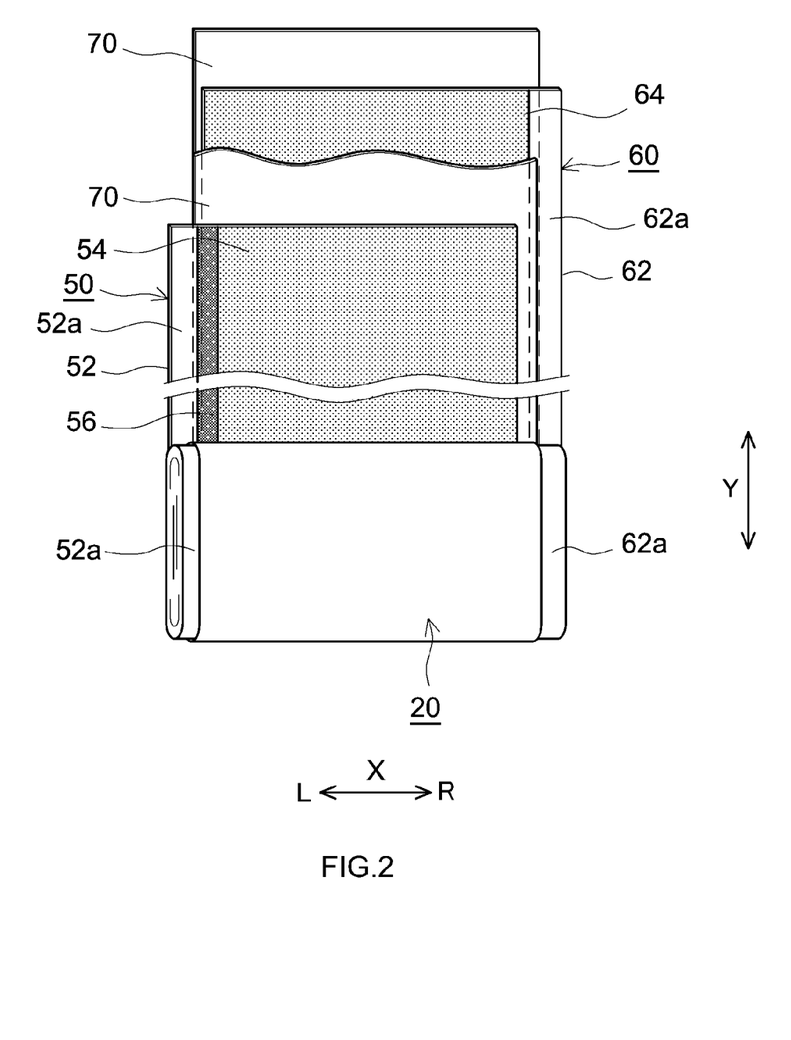
FIG. 2 is a schematic view showing a configuration of a wound electrode body according to one embodiment.

FIG. 2 is a schematic view showing a configuration of the wound electrode body 20 according to one embodiment. As shown in FIG. 1 and FIG. 2, the wound electrode body 20 has a form in which a band-like positive electrode sheet 50 and a band-like negative electrode sheet 60 are superimposed with two band-like separator sheets 70 therebetween and wound in a longitudinal direction Y. Here, the electrode body of the lithium ion secondary battery 100 disclosed here is not limited to a wound electrode body, and may be, for example, a so-called flat lamination type electrode body in a form in which a plurality of positive electrode sheets 50 and negative electrode sheets 60 are laminated and insulated by the separator sheet 70 therebetween. Alternatively, a single cell in which one positive electrode sheet 50 and one negative electrode sheet 60 are housed in a battery case may be used.

Figure 3:
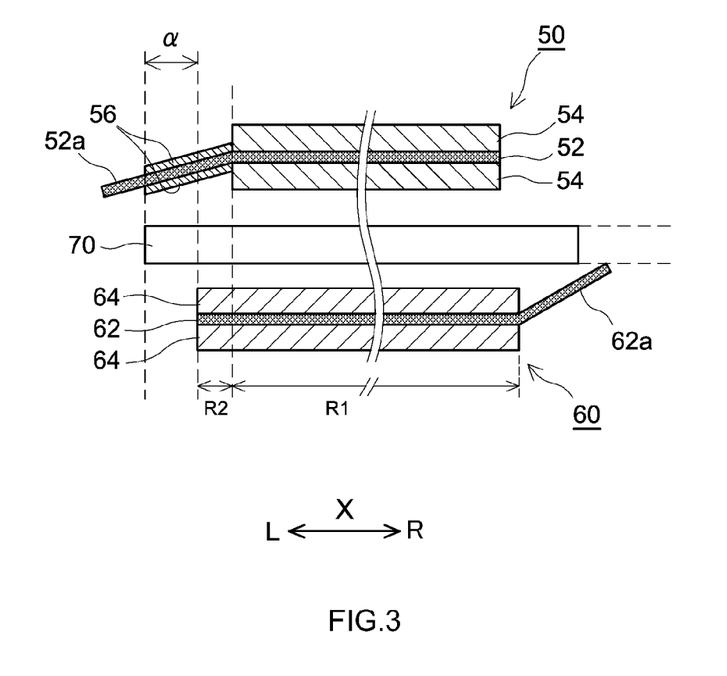
FIG. 3 is a cross-sectional view of a main part of the wound electrode body according to one embodiment.

FIG. 3 is a cross-sectional view of a main part of the wound electrode body 20 according to one embodiment. As shown in FIG. 2 and FIG. 3, the positive electrode sheet 50 includes a band-like positive electrode current collector 52 and a positive electrode active material layer 54 formed on the positive electrode current collector 52 (typically, the surface of the positive electrode current collector 52). Here, in the shown example, the positive electrode active material layer 54 is provided on both surfaces of the positive electrode current collector 52, but may be provided only on one surface. The positive electrode current collector 52 has a part (positive electrode current collector exposed part) 52a in which the positive electrode current collector 52 is exposed without the positive electrode active material layer 54 being formed. As shown in FIG. 2, the positive electrode current collector exposed part 52a is formed so that it protrudes outward (the left side in FIG. 2) from one end (the left end in FIG. 2) of the wound electrode body 20 in a winding axis direction (that is, a longitudinal width direction X).

In addition, the positive electrode sheet 50 has an insulating layer 56 formed on the positive electrode current collector 52 (typically, the surface of the positive electrode current collector 52, that is, the surface of the positive electrode current collector exposed part 52a). The insulating layer 56 is adjacent to the positive electrode active material layer 54. The insulating layer 56 is provided along one end (left side end in FIG. 2) of the positive electrode active material layer 54 in the width direction X. The insulating layer 56 is positioned between the positive electrode active material layer 54 and the positive electrode current collector exposed part 52a in the width direction X. The insulating layer 56 is positioned at the boundary between the positive electrode active material layer 54 and the positive electrode current collector exposed part 52a. The insulating layer 56 may be provided so that it extends in the width direction X from above the positive electrode current collector 52 and overlaps a part of the positive electrode active material layer 54. The end of the positive electrode active material layer 54 may be covered with the insulating layer 56. Here, in the shown example, the insulating layer 56 is provided on both surfaces of the positive electrode current collector 52, but may be provided only on one surface. As shown in FIG. 1, the positive electrode current collecting plate 42a is bonded to the positive electrode current collector exposed part 52a.

Examples of the positive electrode current collector 52 include an aluminum foil. The positive electrode active material layer 54 contains a first positive electrode active material. Examples of first positive electrode active materials include a lithium transition metal oxide (for example, $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$) and a lithium transition metal phosphate compound (for example, $LiFePO_4$). Among these, a lithium-nickel-cobalt-manganese-containing transition metal oxide containing Ni, Co and Mn is preferable. The first positive electrode active material may have a layered rock salt structure.

The average particle size of the first positive electrode active material is not particularly limited, but is typically 1 μm or more, preferably 3 μm or more, for example, 5 or more, typically 15 μm or less, preferably 10 μm or less, for example, 8 μm or less. A proportion of the first positive electrode active material in the entire positive electrode active material layer 54 may be about 75 mass % or more, typically 80 mass % or more, for example, 85 mass % or more, and typically 99 mass % or less, for example, 95 mass % or less. In addition, the thickness (average thickness; the same applies hereinafter) of the first positive electrode active material layer is typically 10 μm or more, for example, 15 μm or more, typically 50 μm or less, 30 μm or less, for example, 25 μm or less. In addition, the density of the positive electrode active material layer 54 is not particularly limited, but is typically 1.5 $g/cm^3$ or more, for example, 2 $g/cm^3$ or more and 3 $g/cm^3$ or less, for example, 2.5 $g/cm^3$ or less. Here, unless otherwise specified, "average particle size" in this specification refers to a particle size ($D_{50}$) at 50% in a cumulative volume-based particle size distribution obtained by a laser diffraction scattering method.

The positive electrode active material layer 54 may include components other than the active material, for example, a conductive material, a binder, and lithium phosphate ($Li_3PO_4$). Regarding the conductive material, for example, carbon black such as acetylene black (AB) and other carbon materials (for example, graphite) can be suitably used. The positive electrode active material layer 54 typically does not include an inorganic filler. Regarding the binder, for example, a vinyl halide resin such as polyvinylidene fluoride (PVdF) can be used. A proportion of the binder in the entire positive electrode active material layer 54 is not particularly limited, but may be, for example, 0.1 mass % or more and 20 mass % or less, preferably 0.5 mass % or more and 10 mass % or less or 1 mass % or more and 5 mass % or less.

The insulating layer 56 contains an inorganic filler and a second positive electrode active material. Regarding the inorganic filler, an insulating material is used, and specific examples thereof include inorganic oxides such as alumina ($Al_2O_3$), magnesia (MgO), silica ($SiO_2$), and titania ($TiO_2$), nitrides such as aluminum nitride and silicon nitride, metal hydroxides such as calcium hydroxide, magnesium hydroxide, and aluminum hydroxide, clay minerals such as mica, talc, boehmite, zeolite, apatite, and kaolin, and glass fibers, and these can be used alone or two or more thereof can be used in combination. Among these, alumina, boehmite, and magnesia are preferable. The shape of the inorganic filler is not particularly limited, and may be a particle shape, a fiber shape, a plate shape, a flake shape, or the like. The average particle size of the inorganic filler is not particularly limited, but may be, for example, 0.01 μm or more and 10 μm or less, preferably 0.1 μm or more and 5 μm or less, and more preferably 0.2 μm or more and 2 μm or less. The average particle size of the inorganic filler may be smaller than that of the first positive electrode active material.

Regarding the second positive electrode active material, the same material as the above first positive electrode active material may be exemplified. Among these, a lithium-nickel-cobalt-manganese-containing transition metal oxide is preferable. The second positive electrode active material may include the same material as the first positive electrode active material. The second positive electrode active material may be a material of exactly the same type and properties as the first positive electrode active material or a material of a different type and/or different properties from the first positive electrode active material. When the second positive electrode active material is a material of different properties from the first positive electrode active material, the average particle size of the second positive electrode active material may be smaller than the average particle size of the first positive electrode active material. That is, it can be said that the second positive electrode active material is included in the insulating layer 56, and is less likely to store or release charge carriers (lithium ions, etc.) than the first positive electrode active material. When the average particle size of the second positive electrode active material is reduced and a specific surface area increases, it is possible to improve a storage capacity or a release capacity of charge carriers of the insulating layer 56. In addition, for example, the second positive electrode active material may be a material having a smaller expansion or contraction amount during charging and discharging than the first positive electrode active material. That is, it is necessary to prevent short circuiting between the positive electrode current collector 52 and the edge of a negative electrode active material layer 64. When the expansion or contraction amount of the second positive electrode active material is reduced, the insulating layer 56 is less likely to peel off from the positive electrode current collector 52 during charging and discharging. A proportion of the second positive electrode active material in the entire insulating layer 56, based on mass, may be smaller than a proportion of the first positive electrode active material in the entire positive electrode active material layer 54.

The insulating layer 56 may further contain a binder. Examples of binders include an acrylic binder, a styrene butadiene rubber (SBR), and a polyolefin binder, and a fluorine-based polymer such as polyvinylidene fluoride (PVdF) and polytetrafluoroethylene (PTFE) can be used. Among these, the same binder (for example, a vinyl halide resin such as PVdF) as for the positive electrode active material layer 54 may be contained. A proportion of the binder in the entire insulating layer 56 is not particularly limited, but can be, for example, 1 mass % or more and 30 mass % or less, preferably 3 mass % or more and 25 mass % or less, for example, 5 mass % or more and 20 mass % or less. A proportion of the binder in the entire insulating layer 56, based on mass, may be larger than a proportion of the binder in the entire positive electrode active material layer 54.

Strictly speaking, the thickness (average thickness; the same applies hereinafter) of the insulating layer 56 is not limited, but, for example, when a foreign metal substance is mixed in between a positive electrode and a negative electrode, the thickness is preferably set so that short circuiting between the positive electrode current collector 52 and the negative electrode active material layer 64 due to the foreign metal substance can be sufficiently reduced. In this regard, the thickness of the insulating layer 56 may be 1 μm or more, preferably 3 μm or more, for example, more preferably 4 μm or more. However, it is desirable that the insulating layer 56 have as small a volume as possible because it causes deterioration of foil collection and welding workability. In this regard, the thickness of the insulating layer 56 may be 20 µm or less, for example, 18 µm or less, 15 µm or less, or 10 µm or less (for example, less than 10 µm) or may be 8 µm or less, for example, 6 µm or less, or 5 µm or less. For example, when the thickness of the insulating layer 56 is set as T1 and the thickness of the positive electrode active material layer 54 is set as T2, a ratio (T1/T2) of the thickness T1 to the thickness T2 is 1 or less, typically ½ or less, preferably ⅖ or less, more preferably ⅓ or less, and still more preferably ¼ or less or ⅕ or less. In addition, in order for the insulating layer 56 to sufficiently exhibit its function, the ratio (T1/T2) may be 1/10 or more, for example, ⅛ or more or ⅙ or more. Here, the thickness T1 of the insulating layer 56 is a height of the insulating layer 56 from the surface of the positive electrode current collector 52, and does not include a thickness in a part in which the insulating layer 56 is formed on the positive electrode active material layer 54 in an overlapping manner.

Here, as shown in FIG. 3, the insulating layer 56 may protrude outward (the left side in FIG. 2) from one end (the left end in FIG. 2) of the negative electrode active material layer 64 in the width direction X by a size α. The insulating layer 56 may have a negative electrode active material layer facing part that faces the negative electrode active material layer 64 and a negative electrode active material layer non-facing part that does not face the negative electrode active material layer 64. The size α is designed to be a size at which, even if the negative electrode active material layer 64 is misaligned, the insulating layer 56 can sufficiently cover the end of the negative electrode active material layer 64 so that a situation in which the negative electrode active material layer 64 and the positive electrode active material layer 54 face each other with only the separator sheet 70 therebetween is avoided.

As shown in FIG. 2 and FIG. 3, the negative electrode sheet 60 includes a band-like negative electrode current collector 62 and the negative electrode active material layer 64 formed on the negative electrode current collector 62 (typically, the surface of the negative electrode current collector 62). Here, in the shown example, the negative electrode active material layer 64 is provided on both surfaces of the negative electrode current collector 62, but may be provided only on one surface. The negative electrode current collector 62 has a part (negative electrode current collector exposed part) 62a in which the negative electrode current collector 62 is exposed without the negative electrode active material layer 64 being formed. As shown in FIG. 2, the negative electrode current collector exposed part 62a is formed so that it protrudes outward (the right side in FIG. 2) from the other end (the right end in FIG. 2) of the wound electrode body 20 in the winding axis direction (that is, the width direction X). As shown in FIG. 1, the negative electrode current collecting plate 44a is bonded to the negative electrode current collector exposed part 62a.

Examples of the negative electrode current collector 62 include a copper foil. The negative electrode active material layer 64 contains a negative electrode active material. Regarding the negative electrode active material, for example, carbon materials such as graphite, hard carbon, and soft carbon may be used. The negative electrode active material layer 64 may contain components other than the active material, for example, a binder and a thickener. Regarding the binder, for example, styrene butadiene rubber (SBR) may be used. Regarding the thickener, for example, carboxymethyl cellulose (CMC) may be used.

The average particle size of the negative electrode active material is not particularly limited, but may be, for example, 0.5 µm or more, preferably 1 µm or more, and more preferably 5 µm or more. In addition, it may be 30 µm or less, preferably 20 µm or less, and more preferably 15 µm or less. A proportion of the negative electrode active material in the entire negative electrode active material layer 64 is suitably about 50 mass % or more, preferably 90 to 99 mass %, for example, 95 to 99 mass %. When a binder is used, a proportion of the binder in the negative electrode active material layer 64 with respect to 100 parts by mass of the negative electrode active material can be, for example, about 0.1 to 5 parts by mass, and generally suitably about 0.5 to 2 parts by mass. The thickness (average thickness; the same applies hereinafter) of the negative electrode active material layer 64 is, for example, 10 µm or more, typically 20 µm or more, and can be 80 µm or less, typically 50 µm or less. In addition, the density of the negative electrode active material layer 64 is not particularly limited, but may be, for example, 0.8 g/cm$^3$ or more, typically 1.0 g/cm$^3$ or more, and can be 1.5 g/cm$^3$ or less, typically 1.4 g/cm$^3$ or less, for example, 1.3 g/cm$^3$ or less.

Here, as shown in FIG. 3, the negative electrode active material layer 64 includes a first region R1 that faces the positive electrode active material layer 54 with the separator sheet 70 therebetween and a second region R2 that faces the insulating layer 56 with the separator sheet 70 therebetween. The first region R1 and the second region R2 may have completely the same configuration or different configurations.

According to the lithium ion secondary battery 100 having the above configuration, it is possible to reduce elution of a metal such as a transition metal in the first positive electrode active material in the positive electrode active material layer 54. The reason for this is not particularly limited, but the reason is speculated to be as follows.

That is, as described above, when the lithium ion secondary battery 100 is charged, lithium ions are released from the positive electrode active material layer 54 into the non-aqueous electrolyte 80. In this case, in the negative electrode, lithium ions in the non-aqueous electrolyte 80 enter the negative electrode active material layer 64 and are stored in the negative electrode active material layer 64. In addition, it is thought that lithium ions are likely to be stored in the first region R1 of the negative electrode active material layer 64 that faces the positive electrode active material layer 54 at the beginning of charging, and also diffuse into the second region R2 that faces the insulating layer 56 but does not face the positive electrode active material layer 54 as charging proceeds. That is, in the negative electrode active material layer 64, lithium ions diffuse not only into the first region R1 but also into the second region R2. Therefore, it is thought that, during charging, the amount of lithium ions released is larger at the edge of the positive electrode active material layer 54 than at an intermediate part that faces the negative electrode active material layer 64 in the width direction X. Therefore, it is thought that a potential may locally increase at the edge of the positive electrode active material layer 54. In this manner, when the potential of the edge of the positive electrode active material layer 54 locally significantly increases, there is a risk of a transition metal in the first positive electrode active material being eluted at the edge.

However, in the present embodiment, when the insulating layer 56 contains the second positive electrode active material, the second positive electrode active material can compensate for insufficient lithium ions at the edge of the positive electrode active material layer 54. As a result, a local increase in the potential of the edge of the positive electrode active material layer 54 is reduced, and it is possible to reduce elution of a transition metal in the first positive electrode active material at the edge.

In addition, when a total capacity (mAh) of the first positive electrode active material is set as C and a total capacity of the negative electrode active material is set as A (mAh), a total capacity (mAh) L of the second positive electrode active material is defined as an amount at which $(1-C/A) \times n$ (where, $n \geq 0.60$) is satisfied, and thus it is possible to further reduce elution of a transition metal in the first positive electrode active material in the positive electrode active material layer 54. The reason for this is not particularly limited, but the reason is speculated to be as follows.

"$1-C/A$" represents a proportion of an insufficient capacity (mAh) with respect to the total capacity A (mAh) of the negative electrode active material. According to studies by the inventors, the second positive electrode active material is included in the insulating layer 56 so that the capacity becomes 0.60 times or more of this proportion, and thus the insufficient capacity (mAh) can be suitably compensated for with the second positive electrode active material. As a result, it is possible to further reduce elution of a transition metal in the first positive electrode active material in the positive electrode active material layer 54. Here, the total capacity represents a product of a theoretical capacity (mAh/g) per unit mass of the positive electrode active material and the mass (g).

For example, in the case of the first positive electrode active material, the theoretical capacity (mAh/g) per unit mass of the active material can be measured as follows. First, a positive electrode (working electrode) is produced using the first positive electrode active material to be measured and disposed in a test cell so that it faces a metal lithium foil (counter electrode), a non-aqueous electrolytic solution being injected thereinto to construct a bipolar cell. Next, under a temperature environment of 25° C., constant current (CC) charging is performed at a rate of 0.1 C. The charging capacity (mAh) in this case is divided by the mass (g) of the first positive electrode active material contained in the cell (used for producing a positive electrode), and thereby a theoretical capacity (mAh/g) per unit mass of the first positive electrode active material can be obtained. As an example, the theoretical capacity per unit mass of $LiNi_{1/3}Co_{1/3}Mn_{1/3}O_2$ is about 170 mAh/g. Here, "1 C" means a current value at which the battery can be charged to a battery capacity (mAh) predicted from the theoretical capacity of the active material in 1 hour. "0.1 C" means a current value at which the battery can be charged to a battery capacity (mAh) predicted from the theoretical capacity of the active material in 10 hours.

Here, the total capacity (mAh) of the second positive electrode active material can also be measured by the following method. First, in the lithium ion secondary battery 100, a region of the positive electrode including the positive electrode active material layer 54 and the insulating layer 56 is cut into, for example, an area of 20 mm×20 mm, and the areas of the positive electrode active material layer 54 and the insulating layer 56 are calculated. Then, the positive electrode is peeled off from the negative electrode, disposed in a test cell so that it faces a metal lithium foil (counter electrode), and a non-aqueous electrolytic solution is injected thereinto to construct a bipolar cell. Next, constant current (CC) charging is performed at a rate of 0.1 C under a temperature environment of 25° C. Using the charging capacity (mAh) in this case, the total capacity (mAh) of the second positive electrode active material contained in the insulating layer 56 can be determined from the calculated areas of the positive electrode active material layer 54 and the insulating layer 56, and the capacity (mAh) predicted from the unit weight of the positive electrode active material layer 54.

In addition, the total capacity (mAh) L of the second positive electrode active material is defined as an amount at which $(1-C/A) \times n$ (where, $n \geq 0.65$) is satisfied, and thus elution of a transition metal in the first positive electrode active material can be reduced. In addition, it is possible to reduce deposition of metallic lithium on the surface of the negative electrode active material layer. The value of n may be, for example, 0.9 or less, 0.8 or less, or 0.7 or less.

Here, the range of A/C called an opposing capacity ratio is not particularly limited, but in order to improve deposition resistance of metallic lithium in the negative electrode, for example, the range is suitably 1.0 or more and preferably 1.1 or more, and in consideration of the energy density of the battery, for example, the range is suitably 2.0 or less and preferably 1.8 or less.

Examples of the separator sheet 70 include a porous sheet (film) made of a resin such as polyethylene (PE), polypropylene (PP), polyester, cellulose, and polyamide. Such a porous sheet may have a single-layer structure or a structure in which two or more layers are laminated (for example, a three-layer structure in which a PP layer is laminated on both surfaces of a PE layer). A heat resistant layer (HRL) may be provided on the surface of the separator sheet 70.

In the present embodiment, a non-aqueous electrolytic solution is used as the non-aqueous electrolyte 80. The non-aqueous electrolyte 80 typically contains a non-aqueous solvent and a supporting salt. Regarding the non-aqueous solvent, organic solvents such as various carbonates, ethers, esters, nitriles, sulfones, and lactones used in the electrolytic solution of general lithium ion secondary batteries can be used without particular limitation. Among these, carbonates are preferable, and specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). These non-aqueous solvents can be used alone or two or more thereof can be used in appropriate combination. The non-aqueous solvent may be a non-fluorine-containing organic solvent that does not contain fluorine. Regarding the supporting salt, for example, a lithium salt such as $LiPF_6$, $LiBF_4$, and $LiClO_4$ (preferably, $LiPF_6$) can be suitably used. The concentration of the supporting salt is preferably 0.7 mol/L or more and 1.3 mol/L or less.

As long as the effects of the technology disclosed here are not significantly impaired, the non-aqueous electrolyte 80 can contain various additives, for example, a gas generating agent such as biphenyl (BP) and cyclohexylbenzene (CHB); a film-forming agent such as an oxalato complex compound containing boron atoms and/or phosphorus atoms and vinylene carbonate (VC); a dispersant; and a thickener. Here, the non-aqueous electrolyte 80 disclosed here is not limited to a non-aqueous electrolytic solution, and may be, for example, a gel electrolyte, or a solid electrolyte.

The lithium ion secondary battery 100 can be used for various applications. Examples of suitable applications include driving power supplies that are mounted in vehicles such as electric vehicles (EV), plug-in hybrid vehicles (PHV), and hybrid vehicles (HV). The lithium ion secondary battery 100 can be used in the form of an assembled battery in which typically a plurality of batteries are connected in series and/or in parallel.

Here, in the present embodiment, the rectangular lithium ion secondary battery 100 including the flat wound electrode body 20 has been described as an example. However, the lithium ion secondary battery can be a lithium ion secondary battery including a laminated electrode body. In addition, the lithium ion secondary battery can be a cylindrical lithium ion secondary battery, a laminated lithium ion secondary battery, or the like. In addition, the technology disclosed here can be applied to non-aqueous electrolyte secondary batteries other than lithium ion secondary batteries.

While examples related to the present invention will be described below, the present invention is not intended to be limited to those shown in the examples.

Production of Lithium Ion Secondary Battery

First, acetylene black (AB) as a conductive material, polyvinylidene fluoride (PVdF) as a binder, and N-methyl-2-pyrrolidone (NMP) as a dispersion medium were mixed using a dispersing machine to obtain a slurry. A mixed powder of $LiNi_{1/3}Co_{1/3}Mn_{1/3}O_2$ (LNCM) and $Li_3PO_4$ as a first positive electrode active material was added to the slurry, and the solid content was then uniformly dispersed to prepare a positive electrode slurry. Here, the positive electrode slurry was prepared so that LNCM:$Li_3PO_4$:AB:PVdF=87:3:8:2 (mass ratio).

Next, boehmite as an inorganic filler, $LiNi_{1/3}CO_{1/3}Mn_{1/3}O_2$ (LNCM) as a second positive electrode active material, PVdF as a binder, and NMP as a dispersion medium were mixed using a dispersing machine to prepare an insulating layer slurry. Here, the insulating layer slurry was prepared so that the content of the second positive electrode active material satisfied conditions shown in Table 1.

Next, the positive electrode slurry and the insulating layer slurry were applied in a band form to both surfaces of a band-like aluminum foil using a die coater from the same die head at the same time so that conditions shown in Table 1 were satisfied, and dried and pressing was then performed to produce a positive electrode sheet. Application was performed so that the insulating layer slurry was adjacent to the positive electrode slurry.

In this manner, the positive electrode sheet in the form shown in FIG. 3 was produced.

Next, natural graphite (C) as a negative electrode active material, styrene butadiene rubber (SBR) as a binder, and carboxymethyl cellulose (CMC) as a thickener were mixed with deionized water at a mass ratio of C:SBR:CMC=98:1:1 to prepare a negative electrode slurry. The negative electrode slurry was applied in a band form to both surfaces of a band-like copper foil so that conditions shown in Table 1 were satisfied and dried and pressing was then performed to produce a negative electrode sheet.

Next, a porous polyolefin sheet having a three-layer structure of PP/PE/PP was prepared as a separator. Then, the positive electrode sheet and negative electrode sheet produced above and the two separator sheets prepared above were laminated and wound, and then pressed and squeezed in the side surface direction to produce a flat wound electrode body.

Next, a positive electrode terminal and a negative electrode terminal were connected to the wound electrode body and housed in a rectangular battery case having an electrolytic solution inlet. Then, a non-aqueous electrolyte solution was injected from the electrolytic solution inlet of the battery case, and the inlet was hermetically sealed. Here, for the non-aqueous electrolytic solution, a solution in which $LiPF_6$ with a concentration of 1.1 mol/L as a supporting salt was dissolved in a mixed solvent containing ethylene carbonate (EC), ethyl methyl carbonate (EMC), and dimethyl carbonate (DMC) at a volume ratio of EC:EMC:DMC=3:4:3 was used. In this manner, lithium ion secondary batteries of the examples and comparative examples were produced.

Evaluation of Lithium Ion Secondary Battery—Evaluation of Elution of Transition Metal—

A lithium ion secondary battery with a state of charge (SOC) adjusted to 100% was left at 60° C. for 120 days. Then, the lithium ion secondary battery was disassembled, and the amount of manganese (Mn) (based on the amount of carbon (C)) present on the surface of the negative electrode was measured through laser ablation ICP mass spectrometry (LA-ICP-MASS). Regarding an analysis device, an UP213 (trademark) device (commercially available from New Wave Research, Inc.) was used, and measurement was performed according to the attached manual. The column of "Mn elution" in Table 1 shows evaluation results. In Table 1, "⊕" indicates that the value of (amount of Mn of region that faces the edge of positive electrode active material layer [cps])/(amount of Mn of region that faces the intermediate part of the positive electrode active material in the width direction [cps]) was less than 0.0002, "O" indicates that the value was 0.0002 or more and 0.0006 or less, and "X" indicates that the value was more than 0.0006.

Evaluation of Lithium Ion Secondary Battery—Evaluation of Lithium Deposition—

A lithium ion secondary battery with an SOC adjusted to 100% was charged and discharged at −15° C. and 20 C for 5 days. Then, the lithium ion secondary battery was disassembled, and deposition of metallic lithium on the surface of the negative electrode active material layer that faces the edge of the positive electrode active material layer was visually checked. In Table 1, the column of "Li deposition" shows evaluation results. In Table 1, "⊕" indicates that there was almost no lithium deposition on the surface of the negative electrode active material layer, "O" indicates that there was a slightly cloudy deposition, and "X" indicates that deposition was clearly recognized.

TABLE 1

| | Conditions | | | Evaluation results | |
|---|---|---|---|---|---|
| | A/C | n | (1 − C/A) × n | Elution of Mn | Deposition of Li |
| Example 1 | 1.50 | 0.70 | 0.23 | ⊕ | ⊕ |
| Example 2 | | 0.65 | 0.22 | ⊕ | ⊕ |
| Example 3 | | 0.60 | 0.20 | ⊕ | O |
| Example 4 | | 0.55 | 0.18 | O | O |
| Example 5 | | 0.45 | 0.15 | O | O |
| Example 6 | | 0.35 | 0.12 | O | O |
| Comparative Example 1 | | 0 | 0 | X | X |
| Example 7 | 1.17 | 0.65 | 0.09 | ⊕ | ⊕ |
| Example 8 | 1.61 | | 0.25 | ⊕ | ⊕ |
| Example 9 | 1.72 | | 0.27 | ⊕ | ⊕ |
| Example 10 | 1.94 | | 0.32 | ⊕ | ⊕ |

As shown in Table 1, in Examples 1 to 10 in which the insulating layer contained the second positive electrode active material, elution of manganese was reduced compared to Comparative Example 1 in which the insulating layer did not contain the second positive electrode active material. In addition, in Examples 1 to 3 and Examples 7 to 10, elution of manganese was further reduced compared to Examples 4 to 6. In addition, in Examples 1 and 2 and Examples 7 to 10, elution of manganese was reduced and also deposition of metallic lithium was reduced.

As described above, it was found that, according to the non-aqueous electrolyte secondary battery disclosed here, it was possible to reduce elution of a metal such as a transition metal in the positive electrode active material in the positive electrode active material layer. In addition, it was found that, when a total capacity (mAh) L of the second positive electrode active material was defined as an amount at which $(1-C/A) \times n$ (where, $n \geq 0.60$) was satisfied, it was possible to further reduce elution of a metal such as a transition metal in the positive electrode active material in the positive electrode active material layer. In addition, it was found that, when a total capacity (mAh) L of the second positive electrode active material was defined as an amount at which $(1-C/A) \times n$ (where, $n \geq 0.65$) was satisfied, it was possible to reduce elution of a metal such as a transition metal and also it was possible to reduce deposition of a metal such as lithium on the surface of the negative electrode active material layer.

While specific examples of the technology disclosed here have been described above in detail, these are only examples, and do not limit the scope of the claims. The technology described in the scope of the claims includes various modifications and alternations of the specific examples exemplified above.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A non-aqueous electrolyte secondary battery, comprising:
   an electrode body having a structure in which a positive electrode and a negative electrode are laminated with a separator disposed therebetween; and
   a non-aqueous electrolyte, wherein
   the positive electrode includes
   a positive electrode current collector,
   a positive electrode active material layer which is disposed on the positive electrode current collector and contains a first positive electrode active material, and
   an insulating layer which is disposed along one end of the positive electrode active material layer in a predetermined width direction, and contains an inorganic filler and a second positive electrode active material, and
   the negative electrode includes
   a negative electrode current collector, and
   a negative electrode active material layer which is disposed on the negative electrode current collector and contains a negative electrode active material, in which a length in the width direction is longer than a length of the positive electrode active material layer in the width direction, and which faces the positive electrode active material layer and at least a part of the insulating layer.

2. The non-aqueous electrolyte secondary battery according to claim 1, wherein,
   in the electrode body,
   when a total capacity (mAh) of the first positive electrode active material contained in the positive electrode active material layer is set as C and a total capacity (mAh) of the negative electrode active material contained in the negative electrode active material layer is set as A, a total capacity (mAh) L of the second positive electrode active material contained in the insulating layer is defined as an amount at which $(1-C/A) \times n$ (where, $n \geq 0.60$) is satisfied.

3. The non-aqueous electrolyte secondary battery according to claim 1, wherein,
   in the electrode body,
   when a total capacity (mAh) of the first positive electrode active material contained in the positive electrode active material layer is set as C and a total capacity (mAh) of the negative electrode active material contained in the negative electrode active material layer is set as A, a total capacity (mAh) L of the second positive electrode active material contained in the insulating layer is defined as an amount at which $(1-C/A) \times n$ (where, $n \geq 0.65$) is satisfied.

4. The non-aqueous electrolyte secondary battery according to claim 1, wherein
   the first positive electrode active material and the second positive electrode active material each contain a transition metal oxide containing lithium nickel cobalt manganese.

5. The non-aqueous electrolyte secondary battery according to claim 1, wherein
   an average particle size of the second positive electrode active material is smaller than an average particle size of the first positive electrode active material.

6. The non-aqueous electrolyte secondary battery according to claim 1, wherein
   the positive electrode active material layer which is free of inorganic fillers.

7. The non-aqueous electrolyte secondary battery according to claim 1, wherein,
   when the thickness of the insulating layer is set as T1 and the thickness of the positive electrode active material layer is set as T2, a ratio (T1/T2) of the thickness T1 to the thickness T2 is 1 or less.

8. The non-aqueous electrolyte secondary battery according to claim 1, wherein
   in the width direction, the insulating layer protrudes outward from one end of the negative electrode active material layer.

* * * * *